United States Patent
Zhang

(10) Patent No.: US 12,538,244 B2
(45) Date of Patent: Jan. 27, 2026

(54) PRS-SUPPORTING SIDELINK POWER ALLOCATION METHOD, AND APPARATUS, STORAGE MEDIUM, AND TERMINAL

(71) Applicant: SPREADTRUM COMMUNICATIONS (SHANGHAI) CO., LTD., Shanghai (CN)

(72) Inventor: Meng Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 370 days.

(21) Appl. No.: 18/029,559

(22) PCT Filed: Sep. 17, 2021

(86) PCT No.: PCT/CN2021/118971
§ 371 (c)(1),
(2) Date: Mar. 30, 2023

(87) PCT Pub. No.: WO2022/068610
PCT Pub. Date: Apr. 7, 2022

(65) Prior Publication Data
US 2023/0403660 A1   Dec. 14, 2023

(30) Foreign Application Priority Data

Sep. 30, 2020  (CN) .......................... 202011056459.5

(51) Int. Cl.
*H04W 52/38* (2009.01)
*H04L 5/00* (2006.01)
(Continued)

(52) U.S. Cl.
CPC ......... *H04W 52/383* (2013.01); *H04L 5/0051* (2013.01); *H04W 52/242* (2013.01);
(Continued)

(58) Field of Classification Search
None
See application file for complete search history.

(56) References Cited

U.S. PATENT DOCUMENTS

| 2019/0230618 A1 | 7/2019 | Saur et al. |
| 2020/0252880 A1 | 8/2020 | Lei et al. |

(Continued)

FOREIGN PATENT DOCUMENTS

| CN | 108616840 A | 10/2018 |
| CN | 109196925 A | 1/2019 |

(Continued)

OTHER PUBLICATIONS

EPO Extended European Search Report for corresponding EP Application No. 21874271.6; Issued on Feb. 27, 2024; 8 pages.
(Continued)

*Primary Examiner* — Chirag G Shah
*Assistant Examiner* — Suk Jin Kang
(74) *Attorney, Agent, or Firm* — CANTOR COLBURN LLP

(57) ABSTRACT

A Positioning Reference Signal (PRS) supporting sidelink power allocation method is provided. The method includes: determining base transmission power of a PRS based on $P_{CMAX}$, $P_{MAX,CBR}$ and $P_{PRS,SL}(i)$; and allocating PRS transmission power for the PRS, wherein the PRS transmission power is larger than or equal to the base transmission power of the PRS; wherein $P_{CMAX}$ is a maximum transmission power of a terminal, $P_{MAX,CBR}$ is a maximum transmission power of the terminal under a given Channel Busy Ratio (CBR) $P_{PRS,SL}(i)$ is path loss compensation power of the PRS at an i-th positioning occasion of transmitting the PRS, and i indicates that the i-th positioning occasion is transmitted.

16 Claims, 1 Drawing Sheet

S11 — a terminal determines base transmission power of a PRS based on $P_{CMAX}$, $P_{MAX,CBR}$ and $P_{PRS,SL}(i)$ S12 — the terminal allocates PRS transmission power for the PRS, wherein the PRS transmission power is larger than or equal to the base transmission power of the PRS

(51) Int. Cl.
*H04W 52/24* (2009.01)
*H04W 72/044* (2023.01)
*H04W 72/25* (2023.01)
*H04W 72/40* (2023.01)

(52) U.S. Cl.
CPC ....... *H04W 72/0473* (2013.01); *H04W 72/25* (2023.01); *H04W 72/40* (2023.01)

(56) References Cited

U.S. PATENT DOCUMENTS

| | | | | |
|---|---|---|---|---|
| 2020/0260386 A1* | 8/2020 | Ryu | ...................... | H04W 76/14 |
| 2021/0022084 A1 | 1/2021 | Jiang | | |
| 2021/0243701 A1* | 8/2021 | Hong | ................... | H04W 52/34 |
| 2021/0337485 A1* | 10/2021 | Ryu | .................... | H04W 52/247 |
| 2022/0030523 A1* | 1/2022 | Wang | ................. | H04W 52/243 |
| 2022/0078721 A1* | 3/2022 | Xue | ........................ | H04W 4/70 |
| 2022/0124635 A1* | 4/2022 | Guo | .................... | H04W 52/267 |
| 2022/0159588 A1* | 5/2022 | Wang | ................... | H04W 52/14 |
| 2022/0225243 A1* | 7/2022 | Claeson | .............. | H04W 52/327 |
| 2022/0232490 A1* | 7/2022 | Jiang | ................... | H04W 52/242 |
| 2023/0015555 A1* | 1/2023 | Hwang | .............. | H04W 52/367 |
| 2023/0027887 A1* | 1/2023 | Li | ....................... | H04W 52/242 |
| 2023/0051285 A1* | 2/2023 | Yang | ...................... | H04W 4/40 |
| 2023/0076874 A1* | 3/2023 | Jeon | ..................... | H04B 17/309 |
| 2023/0164697 A1* | 5/2023 | Kong | ................... | H04W 52/28 370/318 |
| 2023/0337171 A1* | 10/2023 | Baek | ..................... | H04W 64/00 |
| 2023/0362840 A1* | 11/2023 | Iwai | ...................... | H04W 52/20 |
| 2023/0362995 A1* | 11/2023 | Lei | ...................... | H04W 52/367 |
| 2024/0031945 A1* | 1/2024 | Cheng | ................ | H04W 52/242 |
| 2024/0064655 A1* | 2/2024 | Guo | .................... | H04W 52/242 |
| 2024/0276397 A1* | 8/2024 | Farag | ................. | H04W 52/367 |
| 2025/0088977 A1* | 3/2025 | Wang | ................... | H04L 5/0051 |

FOREIGN PATENT DOCUMENTS

| | | |
|---|---|---|
| CN | 110381573 A | 10/2019 |
| CN | 111356220 A | 6/2020 |
| CN | 111436036 A | 7/2020 |
| WO | 2020167000 A1 | 8/2020 |

OTHER PUBLICATIONS

CNIPA First Office Action for corresponding CN Application No. 202011056459.5; Date of publication: Mar. 26, 2024; 12 pages.
International Search Report for corresponding International Application No. PCT/CN2021/118971; Mailing Date, Nov. 25, 2021.
Zte et al., "Remaining issues in PHY procedures for Rel-16 sidelink", 3GPP TSG RAN WG1 #102-e, R1-2005320, Aug. 17-28, 2020, 11 pages.
Zte et al., "Remaining issues on PHY procedures for Rel-16 sidelink", 3GPP TSG RAN WG1 #100-e, R1-2000401, Feb. 24-Mar. 6, 2020, 16 pages.

* cited by examiner

PRS-SUPPORTING SIDELINK POWER ALLOCATION METHOD, AND APPARATUS, STORAGE MEDIUM, AND TERMINAL

CROSS-REFERENCE TO RELATED APPLICATIONS

This is the U.S. national stage of application No. PCT/CN2021/118971, filed on Sep. 17, 2021. Priority under 35 U.S.C. § 119(a) and 35 U.S.C. § 365(b) is claimed from Chinese Application No. 202011056459.5, filed Sep. 30, 2020, the disclosure of which is also incorporated herein by reference.

TECHNICAL FIELD

The present disclosure generally relates to communication technology field, and more particularly, to a Positioning Reference Signal (PRS)-supporting sidelink power allocation method and apparatus, a storage medium, and a terminal.

BACKGROUND

In Release 16 (R16), research on New Radio (NR) sidelink was introduced, which is mainly applicable to vehicular communication scenarios. In addition, research on positioning of NR air interface Uu is also introduced in R16.

Due to needs of V2X communication, it is very likely that research on positioning will be carried out on sidelink in the future. Specifically, there may be a distinction between relative and absolute position positioning. In addition, for sidelink communication scenarios, discussion will be provided for scenarios of In Coverage (IC), Partial Coverage (PC) and Out of Coverage (OC).

There are many candidate positioning technologies applicable to sidelink including but not limited to: Enhanced Cell ID (E-CID) positioning, cell-based signal Round-Trip Time (RTT), Time Difference of Arrival (TDOA) of signals, method of Angle of Arrival (AoA), method of Angle of Departure (AoD), and Observational Time Difference of Arrival (OTDOA), Uplink Time Difference of Arrival (UTDOA), positioning based on multiple Round-Trip Time (multi-RTT) measurement and other indoor positioning technologies. Further, no matter which positioning technology is adopted, it is very likely that design of sidelink PRS needs to be introduced.

Specifically, in existing sidelink technology, simultaneous transmission of PRS and multiple types of signals is supported. For example, the multiple types of signals may include signals carried on one or more of following channels based on Frequency-Division Multiplexing (FDM): Physical Sidelink Control Channel (PSCCH), Physical Sidelink Share Channel (PSSCH), or Physical Sidelink Feedback Channel (PSFCH).

SUMMARY

Embodiments of the present disclosure provide a PRS-supporting sidelink power allocation method, which may effectively improve balance of power allocation, and at least meet basic demands of PRS for power.

In an embodiment of the present disclosure, a PRS-supporting sidelink power allocation method is provided, including: determining base transmission power of a PRS based on $P_{CMAX}$, $P_{MAX,CBR}$ and $P_{PRS,SL}(i)$; and allocating PRS transmission power for the PRS, wherein the PRS transmission power is larger than or equal to the base transmission power of the PRS; wherein $P_{CMAX}$ is a maximum transmission power of a terminal, $P_{MAX,CBR}$ is a maximum transmission power of the terminal under a given Channel Busy Ratio (CBR), $P_{PRS,SL}(i)$ is path loss compensation power of the PRS at an i-th positioning occasion of transmitting the PRS, and i indicates that the i-th positioning occasion is transmitted.

In an embodiment of the present disclosure, a storage medium having computer instructions stored therein is provided, wherein when the computer instructions are executed by a processor, the above method is performed.

In an embodiment of the present disclosure, a terminal including a memory and a processor is provided, wherein the memory has computer instructions stored therein, and when the processor executes the computer instructions, the above method is performed.

DETAILED DESCRIPTION

As described in the background, in existing sidelink techniques, simultaneous transmission of PRS and multiple signals is supported. However, in the existing techniques, when the power is limited, efficiency and accuracy of signal transmission are likely to decrease by unbalanced allocation.

Inventors of the present disclosure have found through research that the allocated power generally has an upper limit, and it is difficult to enable all signals to be allocated to the upper limit. Therefore, allocation should be made according to transmitted signals, and an order and a ratio of the allocation are quite essential. In the existing techniques, a fixed power allocation method is usually adopted, which leads to transmission errors during a peak period of signal transmission, and low transmission efficiency.

In the embodiments of the present disclosure, by determining the base transmission power of the PRS, and allocating to the PRS the PRS transmission power that is larger than or equal to the base transmission power of the PRS, balance of power allocation may be effectively improved, and at least basic demands of PRS on power are met.

In order to clarify the objects, characteristics and advantages of the disclosure, embodiments of present disclosure will be described in detail in conjunction with accompanying drawings.

Figure 1:
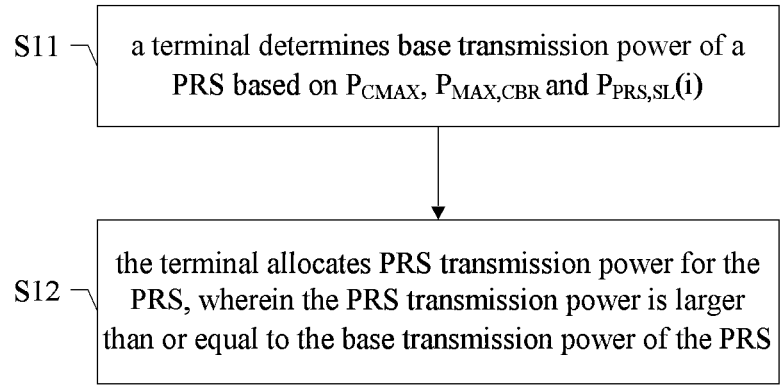
FIG. 1 is a flow chart of a PRS-supporting sidelink power allocation method according to an embodiment.

Referring to FIG. 1, FIG. 1 is a flow chart of a PRS-supporting sidelink power allocation method according to an embodiment. The method may include S11 and S12.

In S11, a terminal determines base transmission power of a PRS based on $P_{CMAX}$, $P_{MAX,CBR}$ and $P_{PRS,SL}(i)$.

In S12, the terminal allocates PRS transmission power for the PRS, wherein the PRS transmission power is larger than or equal to the base transmission power of the PRS.

$P_{CMAX}$ is a maximum transmission power of a terminal, $P_{MAX,CBR}$ is a maximum transmission power of the terminal under a given CBR, $P_{PRS,SL}(i)$ is path loss compensation power of the PRS at an i-th positioning occasion of transmitting the PRS, and i indicates that the i-th positioning occasion is transmitted. $P_{MAX,CBR}$ may be configured by a high-layer signaling of a base station.

In some embodiments, in S11, determining the base transmission power of the PRS is beneficial to ensure basic demands of the transmission power of the PRS.

In some embodiments, the base transmission power of the PRS is determined based on a following formula, $$P_{PRS}(i)=\min(P_{CMAX},P_{MAX,CBR},P_{PRS,SL}(i)),$$

wherein $P_{PRS}(i)$ is the base transmission power of the PRS at the i-th positioning occasion of transmitting the PRS, $P_{CMAX}$ is a maximum transmission power of a terminal, $P_{MAX,CBR}$ is a maximum transmission power of the terminal under a given CBR, $P_{PRS,SL}(i)$ is path loss compensation power of the PRS at an i-th positioning occasion of transmitting the PRS, and i indicates that the i-th positioning occasion is transmitted.

In some embodiments, $P_{PRS,SL}(i)$ is determined based on a following formula, $$P_{PRS,SL}(i) = P_{O,PRS} + 10\log_{10}\left(\frac{2^{\mu} \times M_{RB}^{PRS}(i)}{Combsize}\right) + \alpha_{PRS} \times PL_{PRS} \text{ or}$$

$$P_{PRS,SL}(i) = P_{O,PRS} + 10\log_{10}\left(\frac{2^{\mu} \times M_{RB}^{PRS}(i)}{Combsize}\right),$$

wherein $P_{PRS,SL}(i)$ is the path loss compensation power of the PRS at the i-th positioning occasion of transmitting the PRS, $P_{O,PRS}$ is power of the PRS that the terminal expects to receive, $\mu$ is indication of a subcarrier bandwidth and a CP type of the PRS, $M_{RB}^{PRS}(i)$ is a number of RBs of the PRS transmitted at the i-th positioning occasion of transmitting the PRS, Combsize is a frequency domain density of sidelink PRS, and $\alpha_{PRS}$ is a PRS adjustment coefficient for adjusting the PRS transmission power, and $PL_{PRS}$ is path loss compensation power of the PRS.

In some embodiments, Combsize is a frequency domain density of sidelink PRS, which could be considered as a columnar numeric value of sidelink PRS. For example, Combsize=4, indicating that 1 PRS RE is disposed for every 4 Resource Elements (REs).

It should be noted that, in the above embodiments, the base transmission power of the PRS is determined merely based on $P_{CMAX}$, $P_{MAX,CBR}$ and $P_{PRS,SL(i)}$. In another embodiments, the base transmission power of the PRS is determined further based on a combination with other appropriate parameters.

In some embodiments, in S12, the terminal allocates the PRS transmission power for the PRS, wherein the PRS transmission power is larger than or equal to the base transmission power of the PRS.

In the embodiments of the present disclosure, by determining the base transmission power of the PRS, and allocating to the PRS the PRS transmission power that is larger than or equal to the base transmission power of the PRS, balance of power allocation may be effectively improved, and at least basic demands of PRS on power are met.

Figure 2:
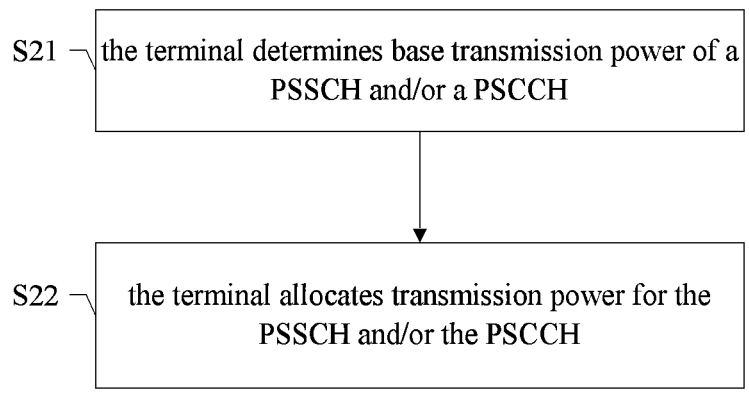
FIG. 2 is a partial flow chart of a PRS-supporting sidelink power allocation method according to an embodiment.

Referring to FIG. 2, FIG. 2 is a partial flow chart of a PRS-supporting sidelink power allocation method according to an embodiment. The method may include S11 and S12 as shown in FIG. 1, and further include S21 and S22 following S12.

In S21, the terminal determines base transmission power of a PSSCH and/or a PSCCH.

In S22, the terminal allocates transmission power for the PSSCH and/or the PSCCH.

The transmission power allocated for the PSSCH is larger than or equal to the base transmission power of the PSSCH, and the transmission power allocated for the PSCCH is larger than or equal to the base transmission power of the PSCCH.

It could be understood that, in some embodiments, the method may be implemented in a manner of a software program which runs in a processor integrated in a chip or a chip module.

It should be noted that said allocating the transmission power for the PSSCH and PSCCH may include two situations, and different methods may be used to determine the base transmission power of the PSSCH according to different situations.

In some embodiments, said allocating transmission power for the PSSCH and the PSCCH includes: allocating transmission power for the PSSCH, and then allocating transmission power for the PSCCH; or allocating transmission power for the PSCCH, and then allocating transmission power for the PSSCH.

In some embodiments, based on that the transmission power is allocated first for the PSSCH and then for the PSCCH, the base transmission power of the PSSCH is determined based on a following formula, $$P_{PSSCH}(i)=\min(\min(P_{CMAX},P_{MAX,CBR})-P_{PRS}(i),\min(P_{PSSCH,D}(i),P_{PSSCH,SL}(i))),$$

wherein $P_{PSSCH}(i)$ is the base transmission power of the PSSCH at an i-th positioning occasion of transmitting the PSSCH, $P_{PSSCH,D}(i)$ is the transmission power of the PSSCH at the i-th positioning occasion of transmitting the PSSCH, and $P_{PSSCH,SL}(i)$ is the transmission power of the PSSCH at the i-th positioning occasion of transmitting the PSSCH.

An air interface connection (Uu) link refers to an air interface connection link between the terminal and a network.

In some embodiments, $P_{PSSCH,D}(i)$ may be determined with reference to a path loss factor of the Uu link, and $P_{PSSCH,SL}(i)$ may be determined with reference to a path loss factor of a secondary link.

The base transmission power of the PSCCH is determined based on a following formula, $$P_{PSCCH}(i) = 10\log_{10}\left(\frac{M_{RB}^{PSCCH}(i)}{M_{RB}^{PSSCH}(i)}\right) + P_{PSSCH}(i) \text{ or}$$

$$P_{PSCCH}(i) = \min\left(\min(P_{CMAX}, P_{MAX,CBR}) - P_{PSSCH}(i) - P_{PRS}(i),\right.$$

$$\left. 10\log_{10}\left(\frac{M_{RB}^{PSCCH}(i)}{M_{RB}^{PSSCH}(i)}\right) + P_{PSSCH}(i)\right),$$

wherein $P_{PSCCH}(i)$ is the base transmission power of the PSCCH at an i-th positioning occasion of transmitting the PSCCH, $M_{RB}^{PSCCH}(i)$ is a number of RBs of the PSCCH transmitted at the i-th positioning occasion of transmitting the PSCCH, $M_{RB}^{PSSCH}(i)$ is a number of RBs of the PSSCH transmitted at the i-th positioning occasion of transmitting the PSSCH, and $P_{PSSCH}(i)$ is the base transmission power of the PSSCH at the i-th positioning occasion of transmitting the PSSCH.

It should be noted that $\min(P_{CMAX}, P_{MAX,CBR})-P_{PRS}(i)$ is remaining maximum power after allocating the PRS, and $\min(P_{CMAX}, P_{MAX,CBR})-P_{PSSCH}(i)-P_{PRS}(i)$ is remaining maximum power after allocating the PRS and PSSCH.

It could be understood that, following determining the base transmission power of the PRS, based on first allocating the transmission power for the PSSCH and then allocating the transmission power for the PSCCH, for determining the base transmission power of the PSSCH, the base transmission power of the PRS is first deduced, and for determining the base transmission power of the PSCCH, the base transmission power of the PRS and the PSSCH is first deducted, which may at least meet basic demands on power of the PRS, the PSSCH and/or the PSCCH.

In some embodiments, based on that the transmission power is allocated first for the PSCCH and then for the PSSCH, the base transmission power of the PSCCH is determined based on a following formula, $$P_{PSCCH}(i) = 10\log_{10}\left(\frac{M_{RB}^{PSSCH}(i)}{M_{RB}^{PSSCH}(i)}\right) + P_{PSSCH}(i) \text{ or}$$

$$P_{PSCCH}(i) =$$

$$\min\left(\min(P_{CMAX}, P_{MAX,CBR}) - P_{PRS}(i), 10\log_{10}\left(\frac{M_{RB}^{PSSCH}(i)}{M_{RB}^{PSSCH}(i)}\right) + P_{PSSCH}(i)\right),$$

wherein $P_{PSCCH}(i)$ is the base transmission power of the PSCCH at an i-th positioning occasion of transmitting the PSCCH, $M_{RB}^{PSCCH}(i)$ is a number of RBs of the PSCCH transmitted at the i-th positioning occasion of transmitting the PSCCH, $M_{RB}^{PSSCH}(i)$ is a number of RBs of the PSSCH transmitted at an i-th positioning occasion of transmitting the PSSCH, and $P_{PSSCH}(i)$ is the base transmission power of the PSSCH at the i-th positioning occasion of transmitting the PSSCH.

The base transmission power of the PSSCH is determined based on a following formula, $$P_{PSSCH}(i) = \min(\min(P_{CMAX}, P_{MAX,CBR}) - P_{PSCCH}(i) - P_{PRS}(i), \min(P_{PSSCH,D}(i), P_{PSSCH,SL}(i))),$$

wherein $P_{PSSCH}(i)$ is the base transmission power of the PSSCH at an i-th positioning occasion of transmitting the PSSCH, $P_{PSSCH,D}(i)$ is the transmission power of the PSSCH at the i-th positioning occasion of transmitting the PSSCH, and $P_{PSSCH,SL}(i)$ is the transmission power of the PSSCH at the i-th positioning occasion of transmitting the PSSCH.

In some embodiments, $P_{PSSCH,D}(i)$ may be determined with reference to a path loss factor of the Uu link, and $P_{PSSCH,SL}(i)$ may be determined with reference to a path loss factor of a secondary link.

It should be noted that $\min(P_{CMAX}, P_{MAX,CBR}) - P_{PRS}(i)$ is remaining maximum power after allocating the PRS, and $\min(P_{CMAX}, P_{MAX,CBR}) - P_{PSCCH}(i) - P_{PRS}(i)$ is remaining maximum power after allocating the PRS and PSSCH.

It could be understood that, following determining the base transmission power of the PRS, based on first allocating the transmission power for the PSCCH and then allocating the transmission power for the PSSCH, for determining the base transmission power of the PSSCH, the base transmission power of the PRS is first deduced, and for determining the base transmission power of the PSCCH, the base transmission power of the PRS and the PSSCH is first deducted, which may at least meet basic demands on power of the PRS, the PSSCH and/or the PSCCH.

In the above embodiments, following determining the base transmission power of the PRS, the method further includes: determining the base transmission power of a PSSCH and/or a PSCCH; and allocating the transmission power for the PSSCH and/or the PSCCH, which further effectively improves the balance of power allocation, and at least meets basic demands on power of the PRS, the PSSCH and/or the PSCCH.

In some embodiments, $P_{PSSCH,D}(i)$ and $P_{PSSCH,SL}(i)$ are determined based on following formulas, $$P_{PSSCH,D}(i) = P_{O,D} + 10\log_{10}(2^{\mu} \times M_{RB}^{PSSCH}(i)) + \alpha_D \times PL_D$$

$$P_{PSSCH,SL}(i) = P_{O,SL} + 10\log_{10}(2^{\mu} \times M_{RB}^{PSSCH}(i)) + \alpha_{SL} \times PL_{SL},$$

wherein $P_{O,D}$ is power of the PSSCH that a base station expects to receive, $M_{RB}^{PSSCH}(i)$ is the number of RBs of the PSSCH transmitted at the i-th positioning occasion of transmitting the PSSCH, $\alpha_D$ is a PSSCH adjustment coefficient for adjusting the transmission power of the PSSCH, and $PL_D$ is path loss compensation power of the PSSCH; $P_{O,SL}$ is power of the PSSCH that the base station expects to receive, $\alpha_{SL}$ is a PSSCH adjustment coefficient for adjusting the transmission power of the PSSCH, and $PL_{SL}$ is the path loss compensation power of the PSSCH.

In some embodiments, transmission power is allocated first for the PSSCH and then for the PRS.

In some embodiments, prior to determining the base transmission power of the PRS, the method further includes: determining base transmission power of the PSSCH; and allocating transmission power for the PSSCH; wherein the transmission power allocated for the PSSCH is larger than or equal to the base transmission power of the PSSCH.

Optionally, the base transmission power of the PSSCH is determined based on a following formula, $$P_{PSSCH}(i) = \min(P_{CMAX}, P_{MAX,CBR}, \min(P_{PSSCH,D}(i), P_{PSSCH,SL}(i))),$$

wherein $P_{PSSCH}(i)$ is the base transmission power of the PSSCH at an i-th positioning occasion of transmitting the PSSCH, $P_{PSSCH,D}(i)$ is the transmission power of the PSSCH at the i-th positioning occasion of transmitting the PSSCH, and $P_{PSSCH,SL}(i)$ is the transmission power of the PSSCH at the i-th positioning occasion of transmitting the PSSCH.

In some embodiments, $P_{PSSCH,D}(i)$ may be determined with reference to a path loss factor of the Uu link, and $P_{PSSCH,SL}(i)$ may be determined with reference to a path loss factor of the secondary link.

In some embodiments, the base transmission power of the PRS is determined based on a following formula, $$P_{PRS}(i) = \min(\min(P_{CMAX}, P_{MAX,CBR}) - P_{PSSCH}(i), P_{PRS,SL}(i)),$$

wherein $P_{PRS}(i)$ is the base transmission power of the PRS at the i-th positioning occasion of transmitting the PRS, $P_{CMAX}$ is the maximum transmission power of the terminal, $P_{MAX,CBR}$ is the maximum transmission power of the terminal under the given CBR, $P_{PRS,SL}(i)$ is the path loss compensation power of the PRS at the i-th positioning occasion of transmitting the PRS, $P_{PSSCH}(i)$ is base transmission power of the PSSCH at an i-th positioning occasion of transmitting the PSSCH, and i indicates that the i-th positioning occasion is transmitted.

It should be noted that $\text{Min}(P_{CMAX}, P_{MAX,CBR}) - P_{PSSCH}(i)$ is remaining maximum power after allocating the PSSCH.

It could be understood that, by determining the base transmission power of the PSSCH and then determining the base transmission power of the PRS, basic demands on power of the PRS, the PSSCH are met.

In some embodiments, $P_{PRS,SL}(i)$ is determined based on a following formula, $$P_{PRS,SL}(i) = P_{O,PRS} + 10\log_{10}\left(\frac{2^\mu \times M_{RB}^{PRS}(i)}{Combsize}\right) + \alpha_{PRS} \times PL_{PRS} \text{ or}$$

$$P_{PRS,SL}(i) = P_{O,PRS} + 10\log_{10}\left(\frac{2^\mu \times M_{RB}^{PRS}(i)}{Combsize}\right),$$

wherein $P_{PRS,SL}(i)$ is the path loss compensation power of the PRS at the i-th positioning occasion of transmitting the PRS, $P_{O,PRS}$ is power of the PRS that the terminal expects to receive, $\mu$ is indication of a subcarrier bandwidth and a CP type of the PRS, $M_{RB}^{PRS}(i)$ is a number of RBs of the PRS transmitted at the i-th positioning occasion of transmitting the PRS, Combsize is a frequency domain density of sidelink PRS, and $\alpha_{PRS}$ is a PRS adjustment coefficient for adjusting the PRS transmission power, and $PL_{PRS}$ is path loss compensation power of the PRS.

In the above embodiments, prior to determining the base transmission power of the PRS, the method further includes: allocating transmission power for the PSSCH, wherein the transmission power allocated for the PSSCH is larger than or equal to the base transmission power of the PSSCH, which further effectively improves the balance of power allocation, and at least meets basic demands on power of the PRS and the PSSCH.

In some embodiments, following determining the base transmission power of the PRS, the method further includes: determining base transmission power of a PSCCH; and allocating transmission power for the PSCCH; wherein the transmission power allocated for the PSCCH is larger than or equal to the base transmission power of the PSCCH.

In some embodiments, the base transmission power of the PSCCH is determined based on a following formula, $$P_{PSCCH}(i) = 10\log_{10}\left(\frac{M_{RB}^{PSCCH}(i)}{M_{RB}^{PSSCH}(i)}\right) + P_{PSSCH}(i) \text{ or}$$

$$P_{PSCCH}(i) = \min\left(\min(P_{CMAX}, P_{MAX,CBR}) - P_{PSSCH}(i) - P_{PRS}(i),\right.$$

$$\left.10\log_{10}\left(\frac{M_{RB}^{PSCCH}(i)}{M_{RB}^{PSSCH}(i)}\right) + P_{PSSCH}(i)\right),$$

wherein $P_{PSCCH}(i)$ is the base transmission power of the PSCCH at an i-th positioning occasion of transmitting the PSCCH, $M_{RB}^{PSCCH}(i)$ is a number of RBs of the PSCCH transmitted at the i-th positioning occasion of transmitting the PSCCH, $M_{RB}^{PSSCH}(i)$ is a number of RBs of the PSSCH transmitted at the i-th positioning occasion of transmitting the PSSCH, and $P_{PSSCH}(i)$ is the base transmission power of the PSSCH at the i-th positioning occasion of transmitting the PSSCH.

It should be noted that $\min(P_{CMAX}, P_{MAX,CBR}) - P_{PSSCH}(i) - P_{PRS}(i)$ is remaining maximum power after allocating the PRS and PSSCH.

It could be understood that determining the base transmission power of the PSSCH first, then determining the base transmission power of the PRS, and then determining the base transmission power of the PSCCH may at least meet basic demands on power of the PSSCH, the PRS and the PSCCH.

In the above embodiments, before the base transmission power of the PRS is determined, the transmission power is further allocated to the PSSCH, and after the base transmission power of the PRS is determined, the transmission power is further allocated to the PSCCH. The balance of power allocation may be further effectively improved, and at least basic demands on power of the PSSCH, the PRS and the PSCCH are met.

Figure 3:
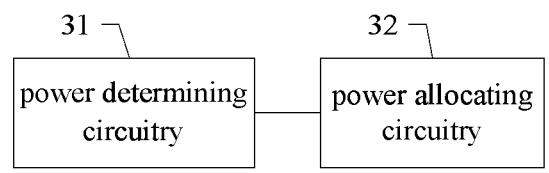
FIG. 3 is a structural diagram of a PRS-supporting sidelink power allocation apparatus according to an embodiment.

Referring to FIG. 3, FIG. 3 is a structural diagram of a PRS-supporting sidelink power allocation apparatus according to an embodiment. The apparatus includes a power determining circuitry 31 and a power allocating circuitry 32.

The power determining circuitry 31 is configured to determine base transmission power of a PRS based on $P_{CMAX}$, $P_{MAX,CBR}$ and $P_{PRS,SL}(i)$.

The power allocating circuitry 32 is configured to allocate PRS transmission power for the PRS, wherein the PRS transmission power is larger than or equal to the base transmission power of the PRS.

In some embodiments, the above apparatus may correspond to a chip with a data processing function in a UE, or to a chip module including a chip with a data processing function in a UE, or to a UE.

Principles, specific implementations and advantages of the apparatus can be referred to related descriptions of the method as described in the above context, and are not repeated here.

The technical solutions of the present disclosure can be applied to 5G communication systems, 4G and 3G communication systems, and various new communication systems in the future, such as 6G and 7G communication systems.

In an embodiment of the present disclosure, a storage medium having computer instructions stored therein is provided, wherein when the computer instructions are executed by a processor, the above method is performed. In some embodiments, the storage medium may be a computer readable storage medium, and may include a non-volatile or a non-transitory memory, or include an optical disk, a mechanical disk or a solid disk.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a terminal including a memory and a processor is provided, wherein the memory has computer instructions stored therein, and when the processor executes the computer instructions, the above method is performed. The terminal may include but not limited to a mobile phone, a computer or a tablet computer.

The terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

Each module/unit of each apparatus and product described in the above embodiments may be a software module/unit or a hardware module/unit, or may be a software module/unit in part, and a hardware module/unit in part. For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/uinits may be implemented by hardware such as circuits.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Positioning Reference Signal (PRS)-supporting sidelink power allocation method, comprising:
determining base transmission power of a PRS based on $P_{CMAX}$, $P_{MAX,CBR}$ and $P_{PRS,SL}(i)$; and
allocating PRS transmission power for the PRS, wherein the PRS transmission power is larger than or equal to the base transmission power of the PRS;
wherein $P_{CMAX}$ is a maximum transmission power of a terminal, $P_{MAX,CBR}$ is a maximum transmission power of the terminal under a given Channel Busy Ratio (CBR), $P_{PRS,SL}(i)$ is path loss compensation power of the PRS at an i-th positioning occasion of transmitting the PRS, and i indicates that the i-th positioning occasion is transmitted;
wherein the base transmission power of the PRS is determined based on a following formula, $$P_{PRS}(i) = \min(P_{CMAX}, P_{MAX,CBR}, P_{PRS,SL}(i)),$$

wherein $P_{PRS}(i)$ is the base transmission power of the PRS at the i-th positioning occasion of transmitting the PRS;
wherein $P_{PRS,SL}(i)$ is determined based on a following formula, $$P_{PRS,SL}(i) = P_{O,PRS} + 10\log_{10}\left(\frac{2^\mu \times M_{RB}^{PRS}(i)}{Combsize}\right) + \alpha_{PRS} \times PL_{PRS}, \text{ or}$$

$$P_{PRS,SL}(i) = P_{O,PRS} + 10\log_{10}\left(\frac{2^\mu \times M_{RB}^{PRS}(i)}{Combsize}\right),$$

wherein $P_{PRS,SL}(i)$ is the path loss compensation power of the PRS at the i-th positioning occasion of transmitting the PRS, $P_{O,PRS}$ is power of the PRS that the terminal expects to receive, μ is indication of a subcarrier bandwidth and a CP type of the PRS, $M_{RB}^{PRS}(i)$ is a number of RBs of the PRS transmitted at the i-th positioning occasion of transmitting the PRS, Combsize is a frequency domain density of sidelink PRS, and $\alpha_{PRS}$ is a PRS adjustment coefficient for adjusting the PRS transmission power, and $PL_{PRS}$ is path loss compensation power of the PRS.

2. The method according to claim 1, wherein following determining the base transmission power of the PRS, the method further comprises:
determining base transmission power of a Physical Sidelink Shared Channel (PSSCH) and/or a Physical Sidelink Control Channel (PSCCH); and
allocating transmission power for the PSSCH and/or the PSCCH;
wherein the transmission power allocated for the PSSCH is larger than or equal to the base transmission power of the PSSCH, and the transmission power allocated for the PSCCH is larger than or equal to the base transmission power of the PSCCH.

3. The method according to claim 2, wherein said allocating transmission power for the PSSCH and the PSCCH comprises:
allocating transmission power for the PSSCH, and then allocating transmission power for the PSCCH; or
allocating transmission power for the PSCCH, and then allocating transmission power for the PSSCH.

4. The method according to claim 3, wherein based on that the transmission power is allocated first for the PSSCH and then for the PSCCH, the base transmission power of the PSSCH is determined based on a following formula, $$P_{PSSCH}(i) = \min(\min(P_{CMAX}, P_{MAX,CBR}) - P_{PRS}(i), \min(P_{PSSCH,D}(i), P_{PSSCH,SL}(i))),$$

wherein $P_{PSSCH}(i)$ is the base transmission power of the PSSCH at an i-th positioning occasion of transmitting the PSSCH, $P_{PSSCH,D}(i)$ is the transmission power of the PSSCH at the i-th positioning occasion of transmitting the PSSCH, and $P_{PSSCH,SL}(i)$ is the transmission power of the PSSCH at the i-th positioning occasion of transmitting the PSSCH; and the base transmission power of the PSCCH is determined based on a following formula, $$P_{PSCCH}(i) = 10\log_{10}\left(\frac{M_{RB}^{PSSCH}(i)}{M_{RB}^{PSSCH}(i)}\right) + P_{PSSCH}(i), \text{ or}$$

$$P_{PSCCH}(i) = \min\left(\min(P_{CMAX}, P_{MAX,CBR}) - P_{PSSCH}(i) - P_{PRS}(i),\right.$$

$$\left. 10\log_{10}\left(\frac{M_{RB}^{PSCCH}(i)}{M_{RB}^{PSSCH}(i)}\right) + P_{PSSCH}(i)\right),$$

wherein $P_{PSCCH}(i)$ is the base transmission power of the PSCCH at an i-th positioning occasion of transmitting the PSCCH, $M_{RB}^{PSCCH}(i)$ is a number of RBs of the PSCCH transmitted at the i-th positioning occasion of transmitting the PSCCH, $M_{RB}^{PSSCH}(i)$ is a number of RBs of the PSSCH transmitted at the i-th positioning occasion of transmitting the PSSCH, and $P_{PSSCH}(i)$ is the base transmission power of the PSSCH at the i-th positioning occasion of transmitting the PSSCH.

5. The method according to claim 3, wherein based on that the transmission power is allocated first for the PSCCH and then for the PSSCH, the base transmission power of the PSCCH is determined based on a following formula, $$P_{PSCCH}(i) = 10\log_{10}\left(\frac{M_{RB}^{PSSCH}(i)}{M_{RB}^{PSSCH}(i)}\right) + P_{PSSCH}(i) \text{ or}$$

$$P_{PSCCH}(i) =$$

$$\min\left(\min(P_{CMAX}, P_{MAX,CBR}) - P_{PRS}(i), 10\log_{10}\left(\frac{M_{RB}^{PSCCH}(i)}{M_{RB}^{PSSCH}(i)}\right) + P_{PSSCH}(i)\right),$$

wherein $P_{PSCCH}(i)$ is the base transmission power of the PSCCH at an i-th positioning occasion of transmitting the PSCCH, $M_{RB}^{PSCCH}(i)$ is a number of RBs of the PSCCH transmitted at the i-th positioning occasion of transmitting the PSCCH, $M_{RB}^{PSSCH}(i)$ is a number of RBs of the PSSCH transmitted at an i-th positioning occasion of transmitting the PSSCH, and $P_{PSSCH}(i)$ is the base transmission power of the PSSCH at the i-th positioning occasion of transmitting the PSSCH; and the base transmission power of the PSSCH is determined based on a following formula, $$P_{PSSCH}(i)=\min(\min(P_{CMAX},P_{MAX,CBR})-P_{PSSCH}(i)-P_{PRS}(i),\min(P_{PSSCH,D}(i),P_{PSSCH,SL}(i)))$$

wherein $P_{PSSCH}(i)$ is the base transmission power of the PSSCH at an i-th positioning occasion of transmitting the PSSCH, $P_{PSSCH,D}(i)$ is the transmission power of the PSSCH at the i-th positioning occasion of transmitting the PSSCH, and $P_{PSSCH,SL}(i)$ is the transmission power of the PSSCH at the i-th positioning occasion of transmitting the PSSCH.

6. The method according to claim 4, wherein $P_{PSSCH,D}(i)$ and $P_{PSSCH,SL}(i)$ are determined based on following formulas, $$P_{SSCH,D}(i)=P_{O,D}+10\log_{10}(2^{\mu} \times M_{RB}^{PSSCH}(i))+\alpha_D \times PL_D$$

$$P_{PSSCH,SL}(i)=P_{O,SL}=10\log_{10}(2^{\mu} \times M_{RB}^{PSSCH}(i))+\alpha_{SL} \times PL_{SL},$$

wherein $P_{O,D}$ is power of the PSSCH that a base station expects to receive, $M_{RB}^{PSSCH}(i)$ is the number of RBs of the PSSCH transmitted at the i-th positioning occasion of transmitting the PSSCH, $\alpha_D$ is a PSSCH adjustment coefficient for adjusting the transmission power of the PSSCH, and $PL_D$ is path loss compensation power of the PSSCH;

$P_{O,SL}$ is power of the PSSCH that the base station expects to receive, $\alpha_{SL}$ is a PSSCH adjustment coefficient for adjusting the transmission power of the PSSCH, and $PL_{SL}$ is the path loss compensation power of the PSSCH.

7. The method according to claim 1, wherein prior to determining the base transmission power of the PRS, the method further comprises:

determining base transmission power of a PSSCH; and allocating transmission power for the PSSCH;
wherein the transmission power allocated for the PSSCH is larger than or equal to the base transmission power of the PSSCH.

8. The method according to claim 7, wherein the base transmission power of the PRS is determined based on a following formula, $$P_{PRS}(i)=\min(\min(P_{CMAX},P_{MAX,CBR})-P_{PSSCH}(i),P_{PRS,SL}(i))$$

wherein $P_{PRS}(i)$ is the base transmission power of the PRS at the i-th positioning occasion of transmitting the PRS, $P_{CMAX}$ is the maximum transmission power of the terminal, $P_{MAX,CBR}$ is the maximum transmission power of the terminal under the given CBR, $P_{PRS,SL}(i)$ is the path loss compensation power of the PRS at the i-th positioning occasion of transmitting the PRS, $P_{PSSCH}(i)$ is base transmission power of the PSSCH at an i-th positioning occasion of transmitting the PSSCH, and i indicates that the i-th positioning occasion is transmitted.

9. The method according to claim 8, wherein $P_{PRS,SL}(i)$ is determined based on a following formula, $$P_{PRS,SL}(i) = P_{O,PRS} + 10\log_{10}\left(\frac{2^{\mu} \times M_{RB}^{PRS}(i)}{Combsize}\right) + \alpha_{PRS} \times PL_{PRS} \text{ or}$$

$$P_{PRS,SL}(i) = P_{O,PRS} + 10\log_{10}\left(\frac{2^{\mu} \times M_{RB}^{PRS}(i)}{Combsize}\right),$$

wherein $P_{PRS,SL}(i)$ is the path loss compensation power of the PRS at the i-th positioning occasion of transmitting the PRS, $P_{O,PRS}$ is power of the PRS that the terminal expects to receive, μ is indication of a subcarrier bandwidth and a CP type of the PRS, $M_{RB}^{PRS}(i)$ is a number of RBs of the PRS transmitted at the i-th positioning occasion of transmitting the PRS, Combsize is a frequency domain density of sidelink PRS, and $\alpha_{PRS}$ is a PRS adjustment coefficient for adjusting the PRS transmission power, and $PL_{PRS}$ is path loss compensation power of the PRS.

10. The method according to claim 8, wherein the base transmission power of the PSSCH is determined based on a following formula, $$P_{PSSCH}(i)=\min(P_{CMAX},P_{MAX,CBR},\min(P_{PSSCH,D}(i),P_{PSSCH,SL}(i))),$$

wherein $P_{PSSCH}(i)$ is the base transmission power of the PSSCH at an i-th positioning occasion of transmitting the PSSCH, $P_{PSSCH,D}(i)$ is the transmission power of the PSSCH at the i-th positioning occasion of transmitting the PSSCH, and $P_{PSSCH,SL}(i)$ is the transmission power of the PSSCH at the i-th positioning occasion of transmitting the PSSCH.

11. The method according to claim 10, wherein following determining the base transmission power of the PRS, the method further comprises:
   determining base transmission power of a PSCCH; and
   allocating transmission power for the PSCCH;
      wherein the transmission power allocated for the PSCCH is larger than or equal to the base transmission power of the PSCCH.

12. The method according to claim 11, wherein the base transmission power of the PSCCH is determined based on a following formula, $$P_{PSCCH}(i) = 10\log_{10}\left(\frac{M_{RB}^{PSCCH}(i)}{M_{RB}^{PSSCH}(i)}\right) + P_{PSSCH}(i) \text{ or}$$

$$P_{PSCCH}(i) = \min\left(\min(P_{CMAX}, P_{MAX,CBR}) - P_{PSSCH}(i) - P_{PRS}(i),\right.$$

$$\left.10\log_{10}\left(\frac{M_{RB}^{PSCCH}(i)}{M_{RB}^{PSSCH}(i)}\right) + P_{PSSCH}(i)\right),$$

wherein $P_{PSCCH}(i)$ is the base transmission power of the PSCCH at an i-th positioning occasion of transmitting the PSCCH, $M_{RB}^{PSCCH}(i)$ is a number of RBs of the PSCCH transmitted at the i-th positioning occasion of transmitting the PSCCH, $M_{RB}^{PSCCH}(i)$ is a number of RBs of the PSSCH transmitted at the i-th positioning occasion of transmitting the PSSCH, and $P_{PSSCH}(i)$ is the base transmission power of the PSSCH at the i-th positioning occasion of transmitting the PSSCH.

13. A non-transitory storage medium storing one or more programs, the one or more programs comprising computer instructions, which, when executed by a processor, cause the processor to:
   determine base transmission power of a Positioning Reference Signal (PRS) based on $P_{CMAX}$, $P_{MAX,CBR}$ and $P_{PRS,SL}(i)$; and
   allocate PRS transmission power for the PRS, wherein the PRS transmission power is larger than or equal to the base transmission power of the PRS;
   wherein $P_{CMAX}$ is a maximum transmission power of a terminal, $P_{MAX,CBR}$ is a maximum transmission power of the terminal under a given Channel Busy Ratio (CBR), $P_{PRS,SL}(i)$ is path loss compensation power of the PRS at an i-th positioning occasion of transmitting the PRS, and i indicates that the i-th positioning occasion is transmitted;
   wherein the base transmission power of the PRS is determined based on a following formula, $$P_{PRS}(i) = \min(P_{CMAX}, P_{MAX,CBR}, P_{PRS,SL}(i)),$$

wherein $P_{PRS}(i)$ is the base transmission power of the PRS at the i-th positioning occasion of transmitting the PRS;
wherein $P_{PRS,SL}(i)$ is determined based on a following formula, $$P_{PRS,SL}(i) = P_{O,PRS} + 10\log_{10}\left(\frac{2^\mu \times M_{RB}^{PRS}(i)}{Combsize}\right) + \alpha_{PRS} \times PL_{PRS}, \text{ or}$$

$$P_{PRS,SL}(i) = P_{O,PRS} + 10\log_{10}\left(\frac{2^\mu \times M_{RB}^{PRS}(i)}{Combsize}\right),$$

wherein $P_{PRS,SL}(i)$ is the path loss compensation power of the PRS at the i-th positioning occasion of transmitting the PRS, $P_{O,PRS}$ is power of the PRS that the terminal expects to receive, μ is indication of a subcarrier bandwidth and a CP type of the PRS, $M_{RB}^{PRS}(i)$ is a number of RBs of the PRS transmitted at the i-th positioning occasion of transmitting the PRS, Combsize is a frequency domain density of sidelink PRS, and $\alpha_{PRS}$ is a PRS adjustment coefficient for adjusting the PRS transmission power, and $PL_{PRS}$ is path loss compensation power of the PRS.

14. A terminal comprising a memory and a processor, wherein the memory stores one or more programs, the one or more programs comprising computer instructions, which, when executed by the processor, cause the processor to:
   determine base transmission power of a Positioning Reference Signal (PRS) based on $P_{CMAX}$, $P_{MAX,CBR}$ and $P_{PRS,SL}(i)$; and
   allocate PRS transmission power for the PRS, wherein the PRS transmission power is larger than or equal to the base transmission power of the PRS;
   wherein $P_{CMAX}$ is a maximum transmission power of a terminal, $P_{MAX,CBR}$ is a maximum transmission power of the terminal under a given Channel Busy Ratio (CBR), $P_{PRS,SL}(i)$ is path loss compensation power of the PRS at an i-th positioning occasion of transmitting the PRS, and i indicates that the i-th positioning occasion is transmitted;
   wherein the base transmission power of the PRS is determined based on a following formula, $$P_{PRS}(i) = \min(P_{CMAX}, P_{MAX,CBR}, P_{PRS,SL}(i)),$$

wherein $P_{PRS}(i)$ is the base transmission power of the PRS at the i-th positioning occasion of transmitting the PRS:
wherein $P_{PRS,SL}(i)$ is determined based on a following formula, $$P_{PRS,SL}(i) = P_{O,PRS} + 10\log_{10}\left(\frac{2^\mu \times M_{RB}^{PRS}(i)}{Combsize}\right) + \alpha_{PRS} \times PL_{PRS}, \text{ or}$$

$$P_{PRS,SL}(i) = P_{O,PRS} + 10\log_{10}\left(\frac{2^\mu \times M_{RB}^{PRS}(i)}{Combsize}\right),$$

wherein $P_{PRS,SL}(i)$ is the path loss compensation power of the PRS at the i-th positioning occasion of transmitting the PRS, $P_{O,PRS}$ is power of the PRS that the terminal expects to receive, μ is indication of a subcarrier bandwidth and a CP type of the PRS, $M_{RB}^{PRS}(i)$ is a number of RBs of the PRS transmitted at the i-th positioning occasion of transmitting the PRS, Combsize is a frequency domain density of sidelink PRS, and $\alpha_{PRS}$ is a PRS adjustment coefficient for adjusting the PRS transmission power, and $PL_{PRS}$ is path loss compensation power of the PRS.

15. The terminal according to claim 14, wherein the processor is further caused to:
   determine base transmission power of a Physical Sidelink Shared Channel (PSSCH) and/or a Physical Sidelink Control Channel (PSCCH); and
   allocate transmission power for the PSSCH and/or the PSCCH;
      wherein the transmission power allocated for the PSSCH is larger than or equal to the base transmission power of the PSSCH, and the transmission power allocated for the PSCCH is larger than or equal to the base transmission power of the PSCCH.

16. The terminal according to claim 15, wherein the processor is further caused to:
    allocate transmission power for the PSSCH, and then allocate transmission power for the PSCCH; or
    allocate transmission power for the PSCCH, and then allocate transmission power for the PSSCH.

\* \* \* \* \*